(12) United States Patent
Sugimoto (10) Patent No.: US 8,774,548 B2
(45) Date of Patent: Jul. 8, 2014

(54) IMAGE PROCESSING APPARATUS AND IMAGE PROCESSING METHOD

(75) Inventor: Kousei Sugimoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 241 days.

(21) Appl. No.: 13/112,620

(22) Filed: May 20, 2011

(65) Prior Publication Data

US 2011/0293198 A1    Dec. 1, 2011

(30) Foreign Application Priority Data

May 28, 2010   (JP) ................................ 2010-122451

(51) Int. Cl.
    *G06K 9/40*       (2006.01)
    *H04N 1/46*       (2006.01)

(52) U.S. Cl.
    USPC .......................................... 382/266; 358/532

(58) Field of Classification Search
    CPC ........................................... G06T 2207/20192
    USPC ......... 382/199, 264, 266–269, 274–275, 305, 382/312; 358/3.26, 3.27, 521, 532
    See application file for complete search history.

(56) References Cited

U.S. PATENT DOCUMENTS

| | | | | |
|---|---|---|---|---|
| 5,838,371 A * | 11/1998 | Hirose et al. | ............. | 348/240.2 |
| 6,097,848 A * | 8/2000 | Salvati | ..................... | 382/266 |
| 6,873,372 B2 * | 3/2005 | Hachiya et al. | ............. | 348/625 |
| 7,283,683 B1 * | 10/2007 | Nakamura et al. | ............. | 382/274 |
| 7,346,289 B2 * | 3/2008 | Tamaoki | ..................... | 399/96 |
| 7,719,597 B2 * | 5/2010 | Okada et al. | ................. | 348/335 |
| 8,126,401 B2 * | 2/2012 | Staszewski et al. | ............. | 455/42 |
| 8,199,239 B2 * | 6/2012 | Ooba | ....................... | 348/333.01 |
| 8,259,198 B2 * | 9/2012 | Cote et al. | ................. | 348/246 |
| 8,294,781 B2 * | 10/2012 | Cote et al. | ................. | 348/222.1 |

FOREIGN PATENT DOCUMENTS

| | | |
|---|---|---|
| JP | 02-222267 | 9/1990 |
| JP | 04-284069 | 10/1992 |
| JP | 2003-198878 A | 7/2003 |

* cited by examiner

*Primary Examiner* — Kanjibhai Patel
(74) *Attorney, Agent, or Firm* — Cowan, Liebowitz & Latman, P.C.

(57) ABSTRACT

An image processing apparatus includes: an unit that performs second-order differentiation on an inputted image signal, and outputs the result as an edge enhancement signal; an unit that calculates a first difference value in a form of an absolute value of a difference between pixel values of two first pixels; an unit that calculates a second difference value in a form of an absolute value of a difference between pixel values of two second pixels; an unit that multiplies the second difference value by a first value; an unit that subtracts the multiplication result from the first difference value, limits a lower-limit value of the result to 0, and outputs the result as an edge adjustment coefficient; an unit that corrects the edge enhancement signal through multiplication by the edge adjustment coefficient; and an unit that adds the corrected edge enhancement signal to the image signal.

20 Claims, 6 Drawing Sheets

FIG. 1

FIG. 2A  Yin

FIG. 2B  enh

FIG. 2C  grd1

FIG. 2D  grd2

FIG. 2E  n_ofs — lm1

FIG. 2F  nor_e_ratio — 1(limit_e) — 0

FIG. 2G  edge_enh

FIG. 2H  Yout

FIG. 3A Yin

FIG. 3B enh

FIG. 3C grd1

FIG. 3D grd2

FIG. 3E n_ofs

FIG. 3F nor_e_ratio

FIG. 3G edge_enh

FIG. 3H Yout

FIG. 4

FIG. 5A Yin

FIG. 5B enh

FIG. 5C grd1

FIG. 5D grd2

FIG. 5E n_ofs

FIG. 5F nor_e_ratio

FIG. 5G edge_enh

FIG. 5H grd3

FIG. 5I nor_d_ratio

FIG. 5J detail_enh

FIG. 5K Yout

IMAGE PROCESSING APPARATUS AND IMAGE PROCESSING METHOD

BACKGROUND OF THE INVENTION

1. Field of the Invention

The present invention relates to an image processing apparatus and an image processing method for carrying out an edge enhancement process.

2. Description of the Related Art

Edge enhancement processes in which high-frequency components of images are amplified and image sharpness is enhanced have been carried out for some time in conventional art. In some instances, however, the edge enhancement process entails addition of a wide shoot around edges, so that the periphery of the edge is imparted with a wide white or black fringe. To deal with this problem, some techniques (for instance, Japanese Patent Application Publication Nos. H2-222267 and H4-284069) avoid addition of a wide shoot around edges by multiplying an edge enhancement signal (second-order differentiation signal) by a corrected signal, to correct thereby the edge enhancement signal to a signal that is effective only around a narrow area around the edge.

In the above-described technique, however, the effective range of the edge enhancement signal (region of the image that is affected by the edge enhancement signal) is decided independently of the shape of the edge rise and fall. Accordingly, there are instances where a wide fringe is added around edges in cases of sluggish (gradual) edge rise and fall.

SUMMARY OF THE INVENTION

The present invention provides a technique that allows preventing a wide fringe from being added around edges, also in the case of sluggish edge rise and fall.

A first aspect of the present invention is an image processing apparatus that performs an edge enhancement process on an input image signal, the apparatus comprising:

an edge enhancement signal output unit configured to output an edge enhancement signal for enhancing an edge of an image;

a first difference value calculation unit configured to calculate, taking each pixel in the image signal as a pixel of interest, a first difference value in a form of an absolute value of a difference between pixel values of two first pixels that flank the pixel of interest on a same line as to that of the pixel of interest;

a second difference value calculation unit configured to calculate a second difference value in a form of an absolute value of a difference between pixel values of two second pixels that are respectively positioned on opposite sides to a side of the pixel of interest of the two first pixels, on a same line as that of the pixel of interest;

an edge adjustment coefficient calculation unit configured to output, as an edge adjustment coefficient, a value obtained by subtracting a value based on the second difference value from the first difference value;

a correction unit configured to correct the edge enhancement signal by multiplying the edge enhancement signal by the edge adjustment coefficient; and an addition unit configured to add the corrected edge enhancement signal to the image signal.

A second aspect of the present invention is an image processing method that is executed in an image processing apparatus that performs an edge enhancement process on an input image signal, the method comprising:

outputting an edge enhancement signal for enhancing an edge of an image;

taking each pixel in the image signal as a pixel of interest, calculating a first difference value in a form of an absolute value of a difference between pixel values of two first pixels that flank the pixel of interest on a same line as to that of the pixel of interest;

calculating a second difference value in a form of an absolute value of a difference between pixel values of two second pixels that are respectively positioned on opposite sides to a side of the pixel of interest of the two first pixels, on a same line as that of the pixel of interest;

outputting, as an edge adjustment coefficient, a value obtained by subtracting a value based on the second difference value from the first difference value;

correcting the edge enhancement signal by multiplying the edge enhancement signal by the edge adjustment coefficient; and adding the corrected edge enhancement signal to the image signal.

A third aspect of the present invention is an image processing apparatus that performs an edge enhancement process on an inputted image signal, the apparatus comprising:

an edge enhancement signal calculation unit that performs second-order differentiation on the image signal, for each line, and outputs the result as an edge enhancement signal;

a first difference value calculation unit that, taking each pixel in the image signal as a pixel of interest, calculates a first difference value in a form of an absolute value of a difference between pixel values of two first pixels that flank the pixel of interest on a same line as to that of the pixel of interest;

a second difference value calculation unit that calculates a second difference value in a form of an absolute value of a difference between pixel values of two second pixels that are respectively positioned on opposite sides to a side of the pixel of interest of the two first pixels, on a same line as that of the pixel of interest;

a multiplication unit that multiplies the second difference value by a first value which is smaller than 1;

an edge adjustment coefficient calculation unit that subtracts the multiplication result of the multiplication unit from the first difference value, limits a lower-limit value of the result to 0, and outputs the result as an edge adjustment coefficient;

a correction unit that corrects the edge enhancement signal through multiplication by the edge adjustment coefficient; and an addition unit that adds the corrected edge enhancement signal to the image signal.

A fourth aspect of the present invention is an image processing method that is executed in an image processing apparatus that performs an edge enhancement process on an inputted image signal, the method comprising:

an edge enhancement signal calculation step of performing second-order differentiation on the image signal, for each line, and outputting the result as an edge enhancement signal;

a first difference value calculation step of, taking each pixel in the image signal as a pixel of interest, calculating a first difference value in a form of an absolute value of a difference between pixel values of two first pixels that flank the pixel of interest on a same line as to that of the pixel of interest;

a second difference value calculation step of calculating a second difference value in a form of an absolute value of a difference between pixel values of two second pixels that are respectively positioned on opposite sides to a side of the pixel of interest of the two first pixels, on a same line as that of the pixel of interest;

a multiplication step of multiplying the second difference value by a first value which is smaller than 1;

an edge adjustment coefficient calculation step of subtracting the multiplication result of the multiplication step from the first difference value, limiting a lower-limit value of the result to 0, and outputting the result as an edge adjustment coefficient;

a correction step of correcting the edge enhancement signal through multiplication by the edge adjustment coefficient; and an addition step of adding the corrected edge enhancement signal to the image signal.

A fifth aspect of the present invention is an image processing apparatus comprising: a generation unit configured to generate an edge enhancement signal for enhancing an edge of an image;

a first correction unit configured to correct the edge enhancement signal in accordance with at least one of a degree of change of a gradation value from a low gradation value to a high gradation value in an input image signal and a degree of change of a gradation value from a high gradation value to a low gradation value in the image signal, wherein the change of a gradation value is a spatial change of a gradation value in an image based on the input image data; and a second correction unit configured to correct the image signal on the bases of the corrected edge enhancement signal.

A sixth aspect of the present invention is an image processing method that is executed in an image processing apparatus, the method comprising:

generating an edge enhancement signal for enhancing an edge of an image;

correcting the edge enhancement signal in accordance with at least one of a degree of change of a gradation value from a low gradation value to a high gradation value in an input image signal and a degree of change of a gradation value from a high gradation value to a low gradation value in the image signal, wherein the change of a gradation value is a spatial change of a gradation value in an image based on the input image data; and correcting the image signal on the bases of the corrected edge enhancement signal.

The present invention allows preventing a wide fringe from being added around edges, also in the case of sluggish edge rise and fall.

Further features of the present invention will become apparent from the following description of exemplary embodiments with reference to the attached drawings.

DESCRIPTION OF THE EMBODIMENTS

Embodiment 1

Figure 1:
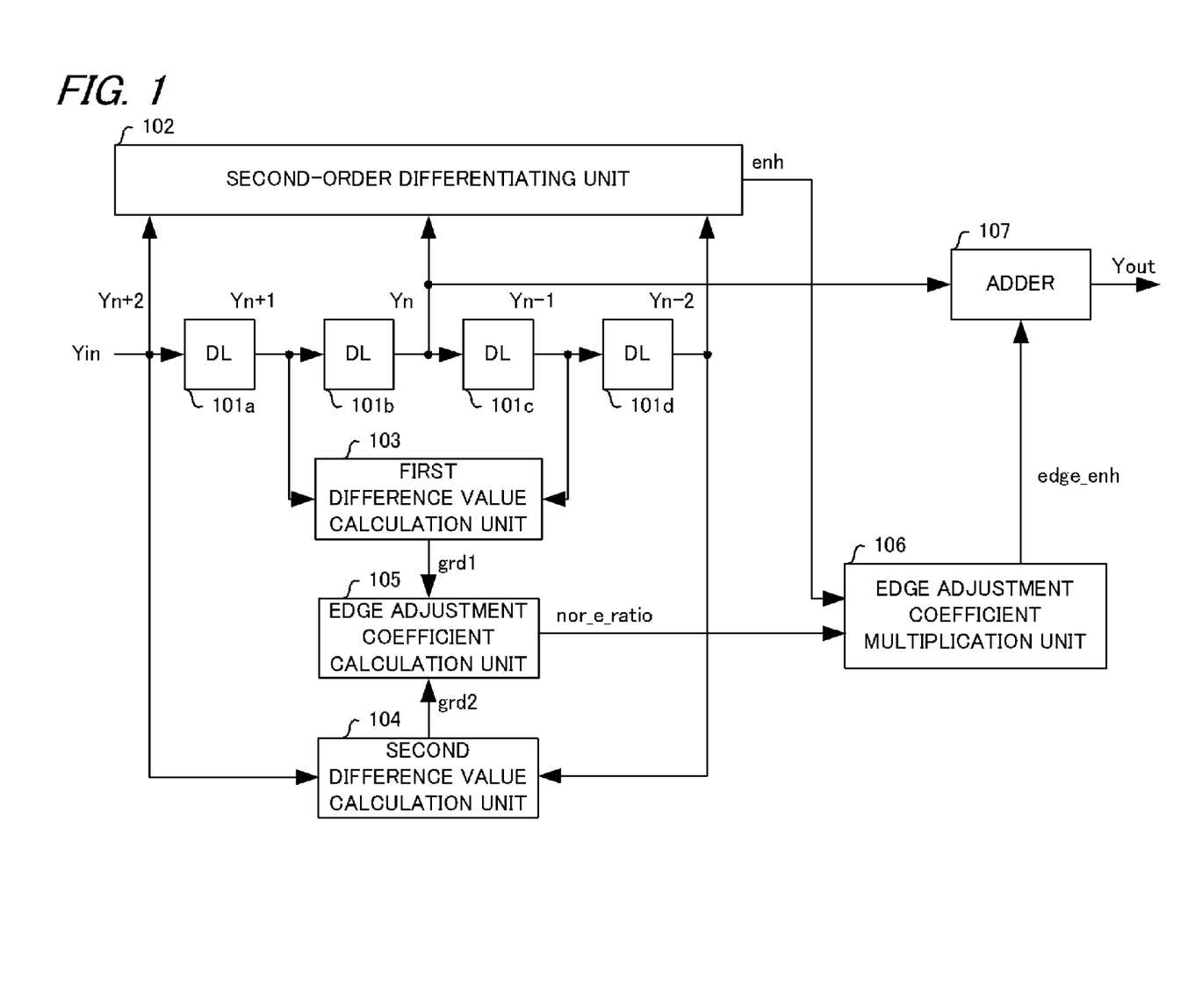
FIG. 1 is a block diagram illustrating an example of the configuration of an image processing apparatus according to Embodiment 1.

An image processing apparatus according to Embodiment 1 of the present invention, as well as an image processing method that is executed by the image processing apparatus, are explained with reference to FIG. 1, FIGS. 2A to 2H, and FIGS. 3A to 3H. The image processing apparatus according to the present embodiment executes an edge enhancement process on an inputted image signal. FIG. 1 is a block diagram illustrating the functional configuration of an image processing apparatus according to the present embodiment. In the figure, blocks 101a to 101d having DL written therein are delay blocks in which an image signal is delayed by 1 pixel. In the present embodiment, the image processing apparatus performs an edge enhancement process on a brightness signal Y in an image signal YCbCr. In the explanation below, the direction in an edge from a low gradation value (low brightness value) towards a high gradation value (high brightness value) will be to referred to as "edge rise", while a direction from a high gradation value to a low gradation value will be referred to as "edge fall".

Firstly, a brightness signal Y of the image signal is inputted via an input terminal, and is delayed, pixel by pixel, by four delay blocks DL101a to 101d. Thereafter, the inputted brightness signal Y will be notated as Yin or Yn+2, and the brightness signals Y delayed in the delay blocks DL101a to 101d will be notated as Yn+1, Yn, Yn−1, Yn−2, respectively. In the present embodiment, the edge enhancement process is carried out using the brightness signal Yn as the brightness signal of a below-described pixel of interest.

A second-order differentiating unit 102 (an edge enhancement signal calculation unit) performs second-order differentiation on the image signal, for each line, and outputs the result as an edge enhancement signal.

Specifically, the second-order differentiating unit 102 calculates an edge enhancement signal (second-order differentiation signal) enh from the brightness signals Yn, Yn+2, Yn−2. The calculation formula is as follows.

$$enh = 2 \times Yn - (Yn+2 + Yn-2)$$

A first difference value calculation unit 103 (a first difference value calculation unit) takes each pixel in the image signal as a pixel of interest, and, for each pixel, calculates a first difference value in the form of the absolute value of the difference between the pixel values of two first pixels that flank the pixel of interest on a same line as that of the pixel of interest. Specifically, the first difference value calculation unit 103 calculates a first difference value grd1 in the form of the absolute value of the difference between the brightness signal Yn+1 and the brightness signal Yn−1. The calculation formula is as follows.

$$grd1 = |Yn+1 - Yn-1|$$

A second difference value calculation unit 104 (a second difference value calculation unit) calculates a second difference value in the form of the absolute value of the difference between pixel values of two second pixels that are respectively positioned on opposite sides to the side of the pixel of interest of the above mentioned two first pixels, on a same line as that of the pixel of interest. Specifically, the second difference value calculation unit 104 calculates a second difference value grd2 in the form of the absolute value of the difference between the brightness signal Yn+2 and the brightness signal Yn−2. The calculation formula is as follows.

$$grd2=|Yn+2-Yn-2|$$

An edge adjustment coefficient calculation unit 105 calculates, and outputs, an edge adjustment coefficient nor_e_ratio on the basis of the first difference value grd1 and the second difference value grd2. The edge adjustment coefficient nor_e_ratio is specifically calculated as follows.

Firstly, the edge adjustment coefficient calculation unit 105 shapes the second difference value grd2 to calculate a shaped difference value n_ofs. Specifically, the edge adjustment coefficient calculation unit 105 (a multiplication unit) multiplies the second difference value grd2 by a first value a1 smaller than 1, to calculate thereby the shaped difference value n_ofs. If at that time the multiplication result is greater than a predetermined threshold value lm1, the shaped difference value n_ofs is taken as the threshold value lm1.

Next, the edge adjustment coefficient calculation unit 105 (an edge adjustment coefficient calculation unit) subtracts the shaped difference value n_ofs from the first difference value grd1, to calculate the edge adjustment coefficient e_ratio. If at that time the subtraction result is smaller than 0, the edge adjustment coefficient e_ratio is set to 0 (i.e., the lower-limit value of the edge adjustment coefficient e_ratio is limited to 0). If the subtraction result is greater than a predetermined threshold value limit_e, the edge adjustment coefficient e_ratio is the threshold value limit_e.

Lastly, the edge adjustment coefficient calculation unit 105 divides the edge adjustment coefficient e_ratio by the threshold value limit_e, to calculate a normalized edge adjustment coefficient nor_e_ratio.

An edge adjustment coefficient multiplication unit 106 (a correction unit) corrects the edge enhancement signal enh through multiplication by the edge adjustment coefficient nor_e_ratio. The corrected edge enhancement signal is notated as edge_enh.

An adder 107 (an addition unit) adds the corrected edge enhancement signal edge_enh to the image signal (brightness signal Yn), and outputs the addition result (brightness signal Yout) from an output terminal.

In the present embodiment, thus, an effective range of an edge enhancement signal (region of the image that is affected by the edge enhancement signal) can be narrowed by using a corrected signal (edge adjustment coefficient nor_e_ratio) obtained by subtracting the shaped difference value n_ofs from the first difference value grd1. The shaped difference value n_ofs is generated from the second difference value grd2, and hence has a value (greater than 0) over a wide range, if the edge rise or fall is sluggish, and a large value, if the edge amplitude is large. Consequently, the shaped difference value n_ofs has likewise a value over a wide range, even if the first difference value grd1 has a value over a wide range on account of a sluggish edge rise and/or fall. As a result, the effective range of the edge enhancement signal can be narrowed according to the degree of sluggishness of the edge rise and/or fall.

An explanation follows next on the operation of the image processing apparatus according to the present embodiment, with reference to FIGS. 2A to 2H and FIGS. 3A to 3H. In FIGS. 2A to 2H and FIGS. 3A to 3H, the horizontal direction represents a position in the image (horizontal position), and the vertical direction represents the magnitude of the image signal (brightness signal Y). FIGS. 2A to 2H illustrate the state of each signal in a case where there is inputted a brightness signal Y of an edge portion having a large brightness jump. FIGS. 3A to 3H illustrate the state of each signal in a case where there is inputted a brightness signal Y of an edge portion having a more sluggish rise and fall than in the case of FIGS. 2A to 2H.

An operation will be explained first, with reference to FIGS. 2A to 2H, of an instance of no sluggish edge rise or fall.

Figure 2A:
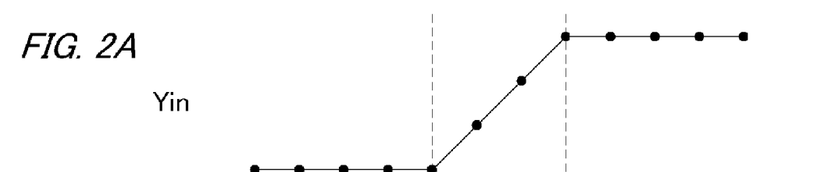
FIGS. 2A to 2H are diagrams illustrating an example of the operation of the image processing apparatus according to Embodiment 1.
Figure 2B:
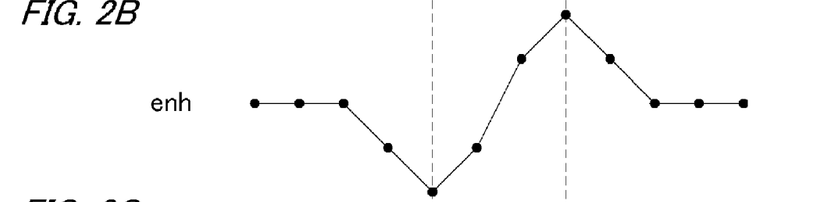
Figure 2C:
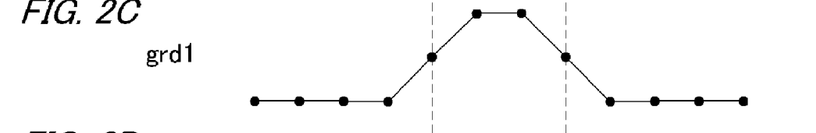
Figure 2D:
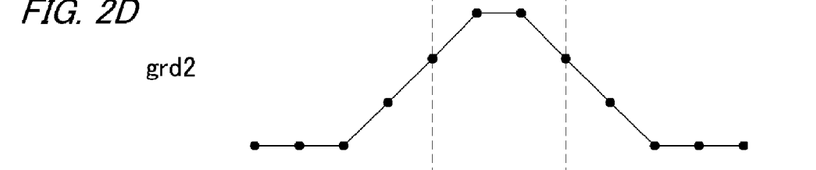

Upon input of the brightness signal brightness signal Yin illustrated in FIG. 2A, the edge enhancement signal enh, which is the output of the second-order differentiating unit 102, becomes as in FIG. 2B. The first difference value grd1, which is the output of the first difference value calculation unit 103, becomes as in FIG. 2C, and the second difference value grd2, which is the output of the second difference value calculation unit 104, becomes as in FIG. 2D.

Figure 2E:
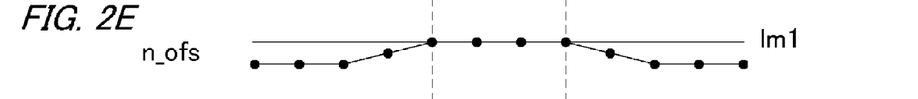
Figure 2F:
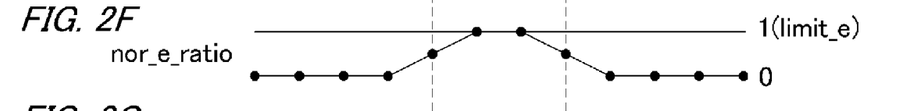

The edge adjustment coefficient calculation unit 105 calculates the edge adjustment coefficient nor_e_ratio on the basis of the first difference value grd1 and the second difference value grd2. Firstly, the edge adjustment coefficient calculation unit 105 calculates the shaped difference value n_ofs (FIG. 2E) on the basis of the second difference value grd2, in accordance with the above-described method. FIG. 2E is an example of an instance where first value a1=0.25. The shaped difference value n_ofs is subtracted from the first difference value grd1, to limit thereby the value (subtraction result) to a range from 0 to the threshold value limit_e, and normalization is carried out to yield the edge adjustment coefficient nor_e_ratio (FIG. 2F). The edge adjustment coefficient nor_e_ratio is normalized by the threshold value limit_e, and hence the lower limit of the edge adjustment coefficient nor_e_ratio is 0, and the upper limit is 1.

Figure 2G:
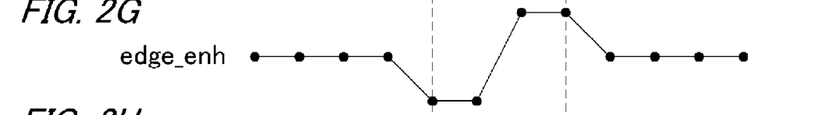

The edge adjustment coefficient multiplication unit 106 multiplies the edge enhancement signal enh by the edge adjustment coefficient nor_e_ratio, to calculate the corrected edge enhancement signal edge_enh (FIG. 2G). FIG. 2B and FIG. 2G show that the effective range of the edge enhancement signal edge_enh after correction is narrower than the effective range of the edge enhancement signal enh before correction.

Figure 2H:
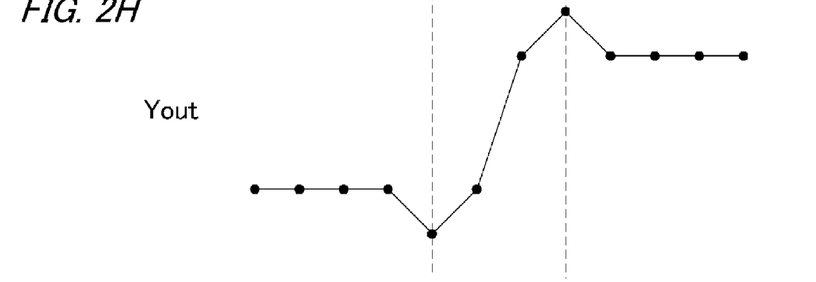

The adder 107 adds the edge enhancement signal edge_enh to the brightness signal Yn (Yin), and outputs the brightness signal Yout (FIG. 2H). FIG. 2H shows that broad shooting (fringing) can be suppressed by using the edge enhancement signal edge_enh after correction.

An operation will be explained next, with reference to FIGS. 3A to 3H, of an instance of sluggish edge rise and/or fall.

Figure 3A:
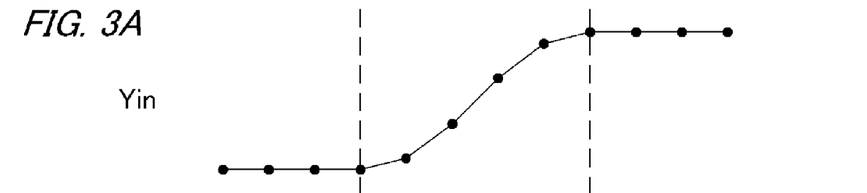
FIGS. 3A to 3H are diagrams illustrating an example of the operation of the image processing apparatus according to Embodiment 1.
Figure 3B:
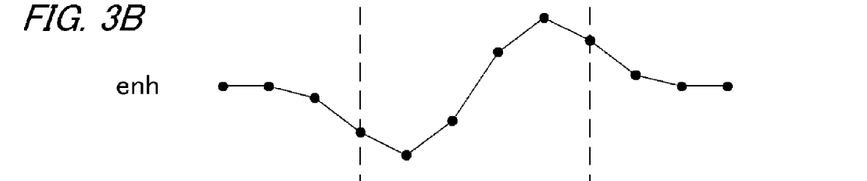
Figure 3C:
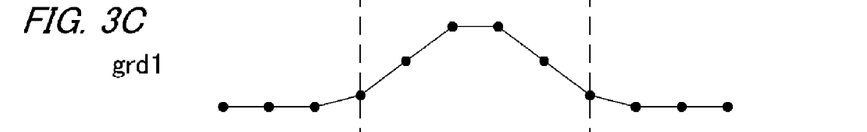
Figure 3D:
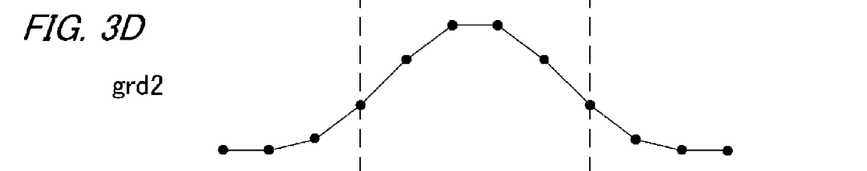

The edge in the brightness signal Yin illustrated in FIG. 3A has a more sluggish rise and fall than the edge in the brightness signal Yin illustrated in FIG. 2A. As a result, the waveform of the first difference value grd1 illustrated in FIG. 3C and the waveform of the second difference value grd2 illustrated in FIG. 3D are both wider than those illustrated in FIG. 2C and FIG. 2D, respectively.

Figure 3E:
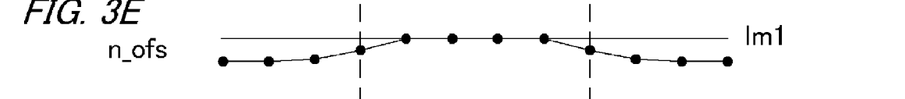
Figure 3F:
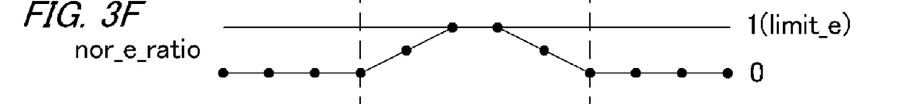
Figure 3G:
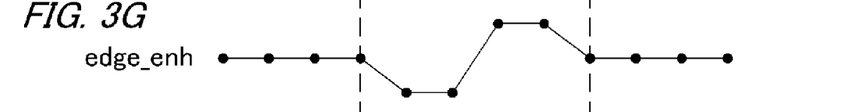
Figure 3H:
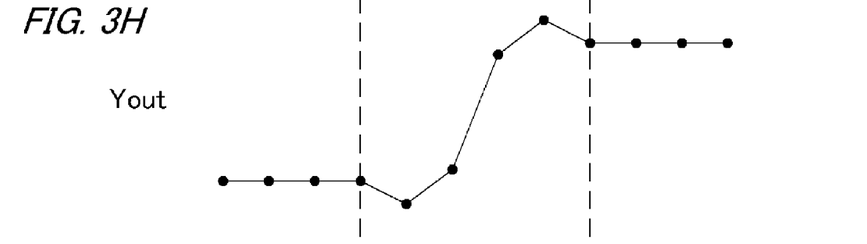

The waveform of the shaped difference value n_ofs is calculated on the basis of the second difference value grd2, and is therefore a wide waveform, as illustrated in FIG. 3E. Upon subtraction of the shaped difference value n_ofs from the first difference value grd1, therefore, a portion having a value (>0) of the first difference value grd1 is subtracted with a shaped difference value n_ofs. As a result there can be obtained a narrow edge adjustment coefficient nor_e_ratio, as illustrated in FIG. 3F. A corrected edge enhancement signal edge_enh having a narrow effective range, illustrated in FIG. 3G, is obtained by multiplying the nor_e_ratio by the edge enhancement signal enh illustrated in FIG. 3B. The brightness signal Yout, in which wide shoot is suppressed, illustrated in FIG. 3H, is then obtained by adding the edge enhancement signal edge_enh to the brightness signal Yn.

The method of the present embodiment makes it possible to carry out an edge enhancement process in which no wide shoot is imparted around an edge, even in case of sluggish edge rise and fall.

Embodiment 2

Figure 4:
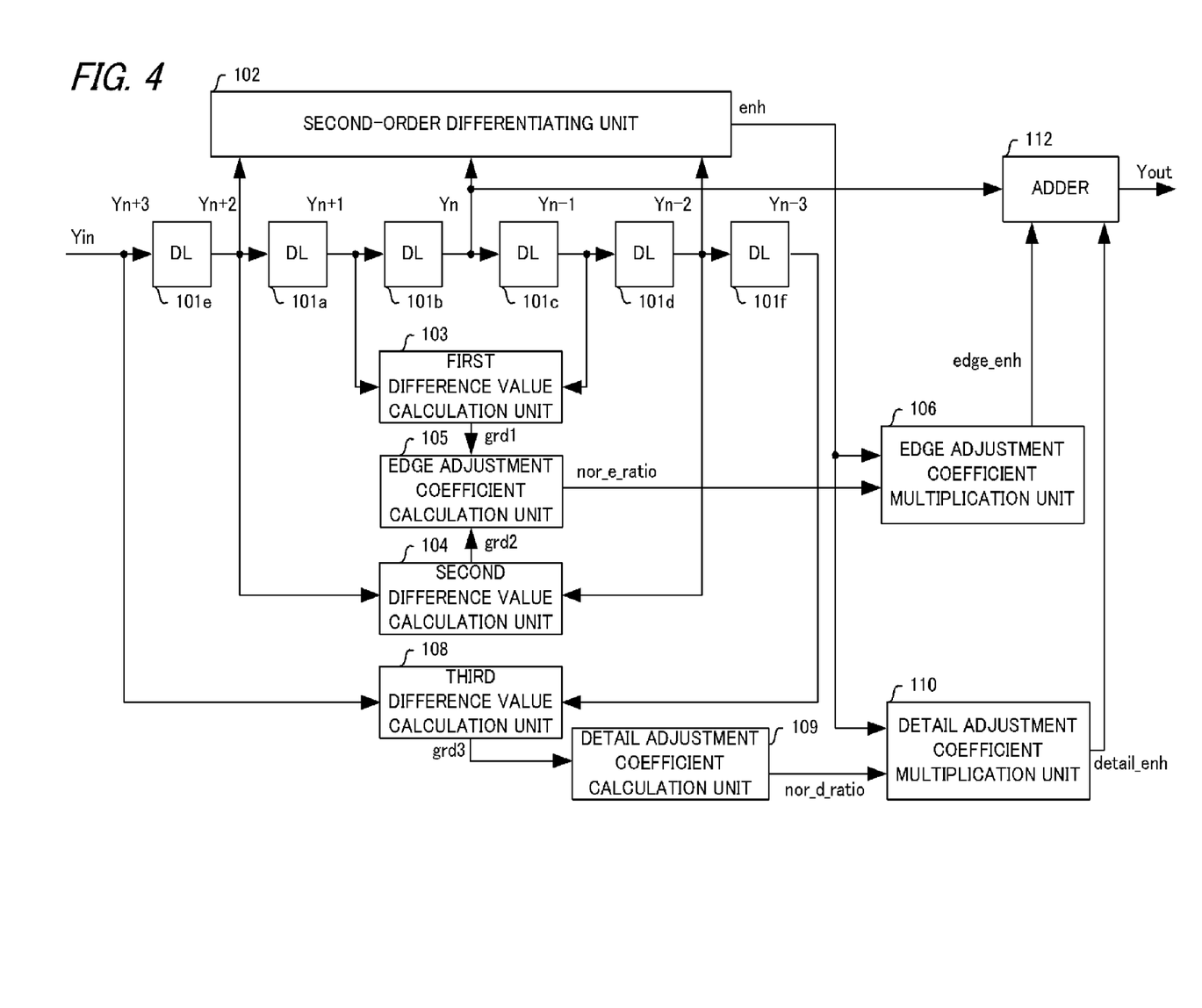
FIG. 4 is a block diagram illustrating an example of the configuration of an image processing apparatus according to Embodiment 2.

An image processing apparatus according to Embodiment 2 of the present invention, as well as an image processing method that is executed by the image processing apparatus, are explained with reference to FIG. 4, FIGS. 5A to 5K, and FIGS. 6A to 6D. In the present embodiment, a detail enhancement signal detail_enh, in which there is enhanced only a "detail" having small brightness amplitude (brightness jump) as compared with the edge, is calculated separately from the edge enhancement signal edge_enh described in Embodiment 1. Thus, details can be enhanced, while suppressing addition of a wide shoot to the edge periphery, by carrying out an edge enhancement process that uses both the edge enhancement signal edge_enh and the detail enhancement signal detail_enh. FIG. 4 illustrates a block diagram of the image processing apparatus according to the present embodiment. Functions identical to those of Embodiment 1 are denoted by the same reference numerals, and an explanation thereof will be omitted.

The image processing apparatus according to the present embodiment has delay blocks 101e, 101f before the delay block 101a and after the delay block 101d, respectively. That is, the image processing apparatus according to the present embodiment has a total of six delay blocks. Thereafter, the inputted brightness signal Y will be notated as Yin or Yn+3, and the brightness signals Y delayed in the delay blocks DL101e, 101f will be notated as Yn+2, Yn−3, respectively.

A third difference value calculation unit 108 (a third difference value calculation unit) calculates a third difference value in the form of the absolute value of the difference between the pixel values of two third pixels that are respectively positioned on opposite sides to the side of the pixel of interest of the two second pixels described in Embodiment 1, on a same line as that of the pixel of interest. Specifically, the third difference value calculation unit 108 calculates a third difference value grd3 in the form of the absolute value of the difference between the brightness signal Yn+3 and the brightness signal Yn−3. The calculation formula is as follows.

$$grd3 = |Yn+3 - Yn-3|$$

A detail adjustment coefficient calculation unit 109 calculates a detail adjustment coefficient nor_d_ratio from the third difference value grd3. The detail adjustment coefficient nor_d_ratio is a signal that is 0 for the edge and the periphery thereof, and substantially 1 elsewhere.

Firstly, the detail adjustment coefficient calculation unit 109 (a detail adjustment coefficient calculation unit) subtracts the third difference value grd3 from a second value limit_d, to calculate a detail adjustment coefficient d_ratio. If the subtraction result is smaller than 0, the detail adjustment coefficient d_ratio is set to 0.

Next, the detail adjustment coefficient calculation unit 109 divides the detail adjustment coefficient d_ratio by the second value limit_d, to calculate a normalized detail adjustment coefficient nor_d_ratio.

A detail adjustment coefficient multiplication unit 110 (a detail enhancement signal calculation unit) multiplies the edge enhancement signal enh by the detail adjustment coefficient nor_d_ratio, and outputs the result as a detail enhancement signal detail_enh.

An adder 111 adds the corrected edge enhancement signal edge_enh and the detail enhancement signal detail_enh to the image signal (brightness signal Yn), and outputs the addition result (brightness signal Yout) from an output terminal.

In the present embodiment described above, not only edges but also details can be enhanced by, in addition to the features of Embodiment 1, calculating the detail enhancement signal detail_enh and adding the detail_enh to the brightness signal Yn. Further, the detail adjustment coefficient nor_d_ratio is calculated by subtracting the third difference value grd3 from the second value, and hence takes on a small value (0 in the present embodiment) at the edge and the periphery thereof. Shoot widening around the edges can be suppressed thereby, through addition of the detail enhancement signal. As a result, details can be enhanced while suppressing addition of a wide shoot around the edge.

An explanation follows next on the operation of the image processing apparatus according to the present embodiment, with reference to FIGS. 5A to 5K, and FIGS. 6A to 6D. FIGS. 5A to 5K and FIGS. 6A to 6D illustrate the position in the image, and the magnitude of the image signal (brightness signal Y), in the horizontal direction and the vertical direction, respectively, in the same manner as in FIGS. 2A to 2H and FIGS. 3A to 3H. FIGS. 5A to 5K illustrate the state of each signal in a case where there is inputted a brightness signal Y of a detail portion having a small brightness jump. FIGS. 6A to 6D illustrate the state of each signal in a case where there is inputted a brightness signal Y (Yin in FIG. 3A) of an edge portion having a large brightness jump. For a more convenient explanation, the features depicted in FIGS. 5A to 5K have been enlarged to double magnification in the vertical direction with respect to those in FIGS. 2A to 2H and FIGS. 3A to 3H.

An instance will be explained first, with reference to FIGS. 5A to 5K, in which there is inputted a brightness signal Y of a detail portion having a small brightness jump.

Figure 5A:
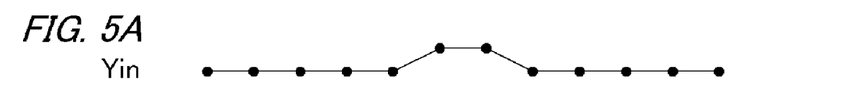
FIGS. 5A to 5K are diagrams illustrating an example of the operation of the image processing apparatus according to Embodiment 2.
Figure 5B:
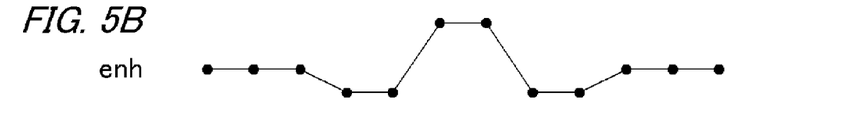
Figure 5C:
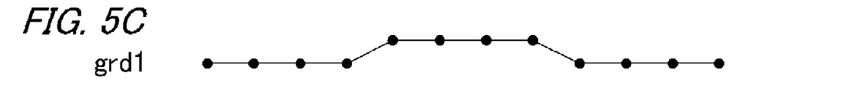
Figure 5D:
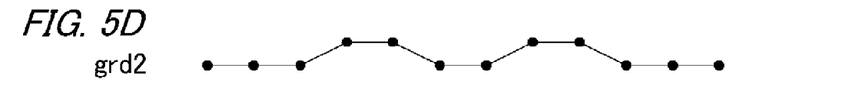
Figure 5E:
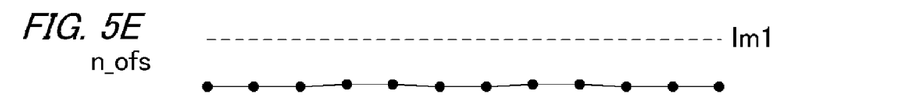
Figure 5F:
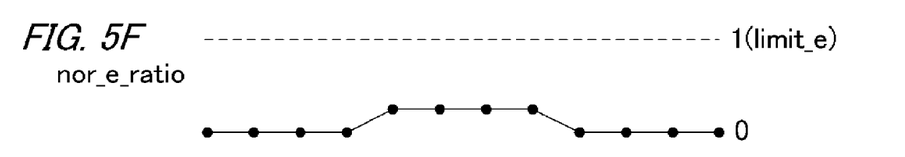
Figure 5G:
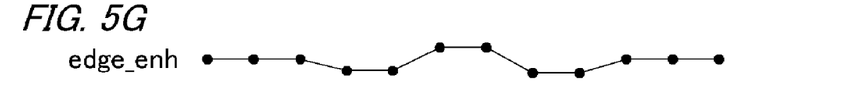
Figure 5H:
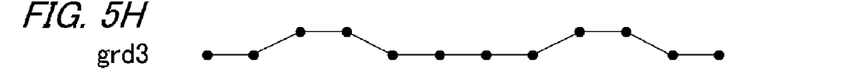

The brightness signal Yin illustrated in FIG. 5A has a small amplitude (difference between the maximum value and the minimum value in the figure). Therefore, the amplitude of the edge enhancement signal enh (FIG. 5B) calculated from the brightness signal Yin is likewise small. Similarly, the first difference value grd1 (FIG. 5C), the second difference value grd2 (FIG. 5D) and the shaped difference value n_ofs (FIG. 5E) exhibit small amplitudes. Accordingly, the amplitude of the edge adjustment coefficient nor_e_ratio has a small amplitude, as illustrated in FIG. 5F. The edge enhancement signal edge_enh corrected using the edge adjustment coefficient nor_e_ratio becomes substantially 0 (edge enhancement signal having no effective range), as illustrated in FIG. 5G.

Figure 5I:
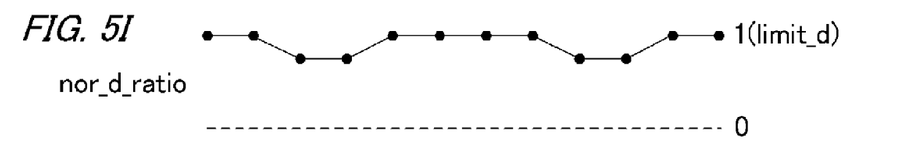
Figure 5J:
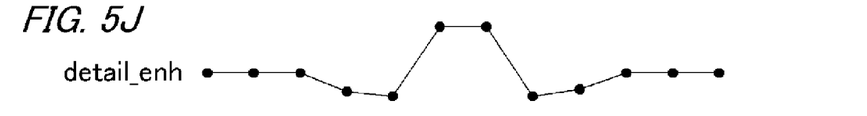

The detail adjustment coefficient nor_d_ratio is obtained by subtracting the third difference value grd3 (FIG. 5H), having a small amplitude value, from the second value limit_d, and hence becomes substantially 1, as illustrated in FIG. 5I. The detail enhancement signal detail_enh is obtained by multiplying the edge enhancement signal enh by the detail adjustment coefficient nor_d_ratio, and becomes therefore substantially identical to that of the edge enhancement signal enh, as illustrated in FIG. 5J.

Figure 5K:
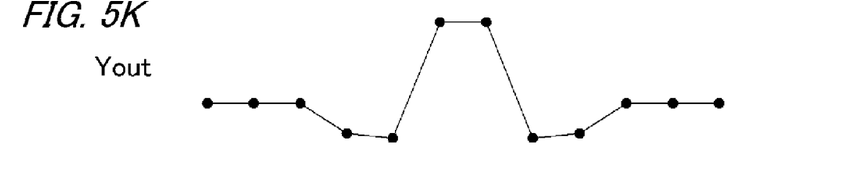

The outputted brightness signal Yout is obtained by adding the detail enhancement signal detail_enh and the edge enhancement signal edge_enh to the inputted brightness signal Yn (Yin). Although the edge enhancement signal edge_enh is substantially 0, the detail enhancement signal detail_enh has a value, and hence there can be obtained a detail-enhanced signal as the brightness signal Yout, as illustrated in FIG. 5K.

An explanation follows next, with reference to FIGS. 6A to 6D, on the operation in an instance where there is inputted the brightness signal Yin of FIG. 3A. The features of the brightness signal Yin, the edge enhancement signal enh, the first difference value grd1, the second difference value grd2, the shaped difference value n_ofs, the edge adjustment coefficient nor_e_ratio and the edge enhancement signal edge_enh are identical to those explained in Embodiment 1 (FIGS. 3A to 3G), and hence a recurrent explanation thereof will be omitted.

Figure 6A:
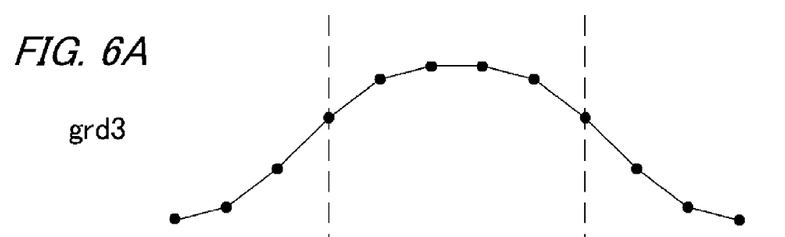
FIGS. 6A to 6D are diagrams illustrating an example of the operation of the image processing apparatus according to Embodiment 2.
Figure 6B:
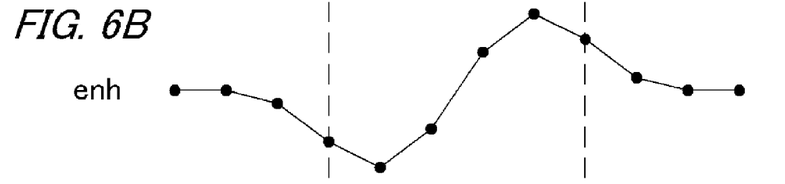
Figure 6C:
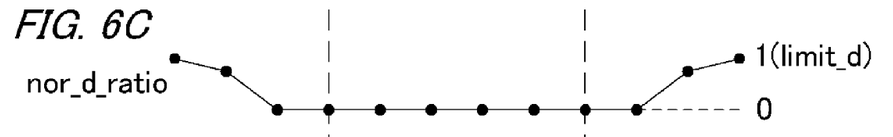
Figure 6D:
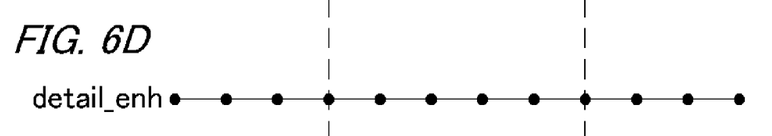

In the example of FIG. 3A, the brightness jump at the edge is substantial. Therefore, the amplitude of the third difference value grd3 is large over a predetermined range that encompasses the edge, as illustrated in 6A. The detail adjustment coefficient nor_d_ratio is obtained by subtracting the third difference value grd3 (FIG. 6A) from the second value limit_d, and becomes therefore 0 within a predetermined range that encompasses the edge, as illustrated in FIG. 6C. The detail enhancement signal detail_enh is obtained by multiplying the edge enhancement signal enh (FIG. 6B) by the detail adjustment coefficient nor_d_ratio, and hence becomes substantially 0, as illustrated in FIG. 6D.

The outputted brightness signal Yout is obtained by adding the detail enhancement signal detail_enh and the edge enhancement signal edge_enh to the inputted brightness signal Yn (Yin). Since the detail enhancement signal detail_enh is 0, the brightness signal Yout is identical to the result in Embodiment 1 (FIG. 3H).

As in Embodiment 1, thus, the method of the present embodiment makes it possible to perform correction in which no wide shoot is imparted to the periphery of an edge, even in a case of sluggish edge rise and fall.

In the present embodiment, an example has been explained wherein the first pixel is adjacent to the pixel of interest, the second pixel is adjacent to the first pixel, and the third pixel is adjacent to the second pixel. However, the positions of the first to third pixels are not limited thereto. The distance with respect to the pixel of interest is not particularly limited, so long as the first pixel, the second pixel and the third pixel are arrayed in this order of proximity to the pixel of interest. The above-described effects can be elicited provided that the pixels are at least arranged in that order.

The second-order differentiation method is not limited to the above-described method. In the present embodiment, for instance, the second-order differentiating unit 102 refers to the pixel of interest and the second pixel to calculate the edge enhancement signal for one pixel, but other pixels may also be referred to. Specifically, pixels positioned within a distance of five pixels from the pixel of interest may be referred to. In this case, the spacing between the above-described two third pixels may be greater than the range of pixels referred to upon calculation of the edge enhancement signal enh, for one pixel, by the second-order differentiating unit 102. This allows the detail adjustment coefficient nor_d_ratio to take on a small value at an edge and the periphery thereof.

The present embodiment has been explained using a plurality of pixels arranged in a screen horizontal direction as one line of pixels, but the line direction is not limited to a horizontal direction. For instance, a plurality of pixels arrayed in the screen vertical direction can make up one line.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-122451, filed on May 28, 2010, which is hereby incorporated by reference herein in its entirety.

What is claimed is:

1. An image processing apparatus that performs an edge enhancement process on an inputted image data, the apparatus comprising:
    an edge enhancement data calculation unit that performs second-order differentiation on the image data, for each line, and outputs the result as an edge enhancement data;
    a first difference value calculation unit that selects each pixel in the image data as a pixel of interest and calculates a first difference value in a form of an absolute value of a difference between pixel values of two first pixels that flank the pixel of interest on a same line as that of the pixel of interest;
    a second difference value calculation unit that calculates a second difference value in a form of an absolute value of a difference between pixel values of two second pixels that are respectively positioned on opposite sides to a side of the pixel of interest of the two first pixels, on a same line as that of the pixel of interest;
    a multiplication unit that multiplies the second difference value by a first value which is smaller than 1;
    an edge adjustment coefficient calculation unit that subtracts the multiplication result of the multiplication unit from the first difference value, limits a lower-limit value of the result to 0, and outputs the result as an edge adjustment coefficient;
    a correction unit that corrects the edge enhancement data through multiplication by the edge adjustment coefficient; and
    an addition unit that adds the corrected edge enhancement data to the image data.

2. The image processing apparatus according to claim 1, further comprising:
    a third difference value calculation unit that calculates a third difference value in a form of an absolute value of a difference between pixel values of two third pixels that are respectively positioned on opposite sides to a side of the pixel of interest of the two second pixels, on a same line as that of the pixel of interest;
    a detail adjustment coefficient calculation unit that subtracts the third difference value from a second value, limiting a lower-limit value of the result to 0, and outputting the result as a detail adjustment coefficient; and
    a detail enhancement data calculation unit that multiplies the edge enhancement data by the detail adjustment coefficient, and outputs the result as a detail enhancement data,
    wherein the addition unit adds the corrected edge enhancement data and the detail enhancement data to the image data.

3. The image processing apparatus according to claim 2, wherein a spacing between the two third pixels is greater than a pixel range that is referred to upon calculation of the edge enhancement data, for one pixel, by the edge enhancement data calculation unit.

4. An image processing method that is executed in an image processing apparatus that performs an edge enhancement process on an inputted image data, the method comprising:
    an edge enhancement data calculation step of performing second-order differentiation on the image data, for each line, and outputting the result as an edge enhancement data;

a first difference value calculation step of selecting each pixel in the image data as a pixel of interest and calculating a first difference value in a form of an absolute value of a difference between pixel values of two first pixels that flank the pixel of interest on a same line as to that of the pixel of interest;

a second difference value calculation step of calculating a second difference value in a form of an absolute value of a difference between pixel values of two second pixels that are respectively positioned on opposite sides to a side of the pixel of interest of the two first pixels, on a same line as that of the pixel of interest;

a multiplication step of multiplying the second difference value by a first value which is smaller than 1;

an edge adjustment coefficient calculation step of subtracting the multiplication result of the multiplication step from the first difference value, limiting a lower-limit value of the result to 0, and outputting the result as an edge adjustment coefficient;

a correction step of correcting the edge enhancement data through multiplication by the edge adjustment coefficient; and an addition step of adding the corrected edge enhancement data to the image data.

5. An image processing apparatus that performs an edge enhancement process on an input image data, the apparatus comprising:

an edge enhancement data output unit configured to output an edge enhancement data for enhancing an edge of an image;

a first difference value calculation unit configured to select each pixel in the image data as a pixel of interest and calculate a first difference value in a form of an absolute value of a difference between pixel values of two first pixels that flank the pixel of interest on a same line as to that of the pixel of interest;

a second difference value calculation unit configured to calculate a second difference value in a form of an absolute value of a difference between pixel values of two second pixels that are respectively positioned on opposite sides to a side of the pixel of interest of the two first pixels, on a same line as that of the pixel of interest;

an edge adjustment coefficient calculation unit configured to output, as an edge adjustment coefficient, a value obtained by subtracting a value based on the second difference value from the first difference value;

a correction unit configured to correct the edge enhancement data by multiplying the edge enhancement data by the edge adjustment coefficient; and an addition unit configured to add the corrected edge enhancement data to the image data.

6. The image processing apparatus according to claim 5, further comprising:

a third difference value calculation unit configured to calculate a third difference value in a form of an absolute value of a difference between pixel values of two third pixels that are respectively positioned on opposite sides to a side of the pixel of interest of the two second pixels, on a same line as that of the pixel of interest;

a detail adjustment coefficient calculation unit configured to output, as a detail adjustment coefficient, a value obtained by subtracting the third difference value from a second value; and a detail enhancement data calculation unit configured to output, as a detail enhancement data, a value obtained by multiplying the edge enhancement data by the detail adjustment coefficient, wherein the addition unit adds the corrected edge enhancement data and the detail enhancement data to the image data.

7. The image processing apparatus according to claim 6, wherein the edge enhancement data for one pixel is a data that is calculated by using pixel values of a plurality of pixels, and wherein a spacing between the two third pixels is greater than a pixel range that is referred to upon calculation of the edge enhancement data for one pixel.

8. An image processing apparatus comprising:

a first generation unit configured to generate an edge enhancement data for enhancing an edge of an image;

a first correction unit configured to correct the edge enhancement data in accordance with at least one of a degree of change of a gradation value from a low gradation value to a high gradation value in an input image data and a degree of change of a gradation value from a high gradation value to a low gradation value in the image data, wherein the change of a gradation value is a spatial change of a gradation value in an image based on the input image data; and a second correction unit configured to correct the image data on the basis bases of the corrected edge enhancement data.

9. The image processing apparatus according to claim 8, wherein the first correction unit narrows an image region that is affected by the edge enhancement data in accordance with at least one of a degree of change of a gradation value from a low gradation value to a high gradation value in the image data and a degree of change of a gradation value from a high gradation value to a low gradation value in the image data.

10. The image processing apparatus according to claim 8, wherein the second correction unit corrects the image data by adding the corrected edge enhancement data to the image data.

11. The image processing apparatus according to claim 8, wherein the gradation value is a brightness value.

12. An image processing apparatus according to claim 8, further comprising:

a first difference value calculation unit configured to select each pixel in the image data as a pixel of interest and calculate a first difference value in a form of an absolute value of a difference between pixel values of two first pixels that flank the pixel of interest on a same line as to that of the pixel of interest;

a second difference value calculation unit configured to calculate a second difference value in a form of an absolute value of a difference between pixel values of two second pixels that are respectively positioned on opposite sides to a side of the pixel of interest of the two first pixels, on a same line as that of the pixel of interest;

wherein a first correction unit corrects the edge enhancement data by using the first difference value and the second difference value.

13. The image processing apparatus according to claim 8, wherein the first correction unit corrects the edge enhancement data on the basis of a difference between gradation values of a first pixel pair in the image data and a difference between gradation values of a second pixel pair.

14. The image processing apparatus according to claim 13, wherein the first correction unit selects each pixel in the image data as a pixel of interest and corrects a value of the edge enhancement data in a position of the pixel of interest, and wherein the pixel of interest is positioned between two pixels constituting the first pixel pair and is positioned between two pixels constituting the second pixel pair.

15. The image processing apparatus according to claim 13, wherein the difference between gradation values of the first pixel pair is a difference between gradation values of a first pixel and a second pixel which is positioned on a same line as that of the first pixel, and wherein the difference between gradation values of the second pixel pair is a difference between gradation values of a third pixel and a fourth pixel which is positioned on a same line as that of the third pixel.

16. The image processing apparatus according to claim 15, wherein the first correction unit selects each pixel in the image data as a pixel of interest and corrects a value of the edge enhancement data in a position of the pixel of interest, wherein the first pixel and the second pixel are adjacent to the pixel of interest on a same line as that of the pixel of interest, wherein the third pixel is adjacent to the first pixel on a same line as that of the pixel of interest, and wherein the fourth pixel is adjacent to the second pixel on a same line as that of the pixel of interest.

17. The image processing apparatus according to claim 8, wherein when a rise or a fall of the edge is sluggish, the first correction unit corrects the edge enhancement data so that an effective range of the edge enhancement data is narrowed.

18. The image processing apparatus according to claim 8, further comprising:

a second generation unit configured to generate a detail enhancement data for enhancing a detail of an image in accordance with at least one of a degree of change of a gradation value from a low gradation value to a high gradation value in the input image data and a degree of change of a gradation value from a high gradation value to a low gradation value in the image data, wherein the change of a gradation value is a spatial change of a gradation value in an image based on the input image data; wherein the second correction unit corrects the image data on the basis of the corrected edge enhancement data and the detail enhancement data.

19. An image processing method that is executed in an image processing apparatus that performs an edge enhancement process on an input image data, the method comprising:

outputting an edge enhancement data for enhancing an edge of an image;

selecting each pixel in the image data as a pixel of interest;

calculating a first difference value in a form of an absolute value of a difference between pixel values of two first pixels that flank the pixel of interest on a same line as that of the pixel of interest;

calculating a second difference value in a form of an absolute value of a difference between pixel values of two second pixels that are respectively positioned on opposite sides to a side of the pixel of interest of the two first pixels, on a same line as that of the pixel of interest;

outputting, as an edge adjustment coefficient, a value obtained by subtracting a value based on the second difference value from the first difference value;

correcting the edge enhancement data by multiplying the edge enhancement data by the edge adjustment coefficient; and adding the corrected edge enhancement data to the image data.

20. An image processing method that is executed in an image processing apparatus, the method comprising:

generating an edge enhancement data for enhancing an edge of an image;

correcting the edge enhancement data in accordance with at least one of a degree of change of a gradation value from a low gradation value to a high gradation value in an input image data and a degree of change of a gradation value from a high gradation value to a low gradation value in the image data, wherein the change of a gradation value is a spatial change of a gradation value in an image based on the input image data; and correcting the image data on the basis of the corrected edge enhancement data.

* * * * *